United States Patent Office 2,788,351
Patented Apr. 9, 1957

2,788,351

TETRAHYDRO-4-OXO-3-FURAN-THIOCARBOXAMIDES

Frederick Leonard, Takoma Park, Md., and Floyd E. Anderson, Yonkers, N. Y., assignors, by mesne assignments, to Warner-Lambert Pharmaceutical Company, Morris Plains, N. J., a corporation of Delaware No Drawing. Application October 1, 1956,
Serial No. 612,969

6 Claims. (Cl. 260—347.2)

This invention relates to certain novel tetrahydrofuranone compounds and relates more particularly to substituted tetrahydrofuranone compounds of the following formula:

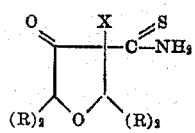

wherein each R is a lower alkyl group containing from one to four carbon atoms, or taken together form a cyclic polyalkylene or cycloaliphatic ring having five to six carbon atoms and X is hydrogen or a halogen, such as chlorine or bromine.

An object of this invention is the provision of a novel group of orally effective sedative and hypnotic compounds which are effective in producing mild sedation with little or no side or after effects. Other objects of this invention will appear from the following detailed description.

The novel compounds of our invention may be obtained, for example, by the addition of a mol of hydrogen sulfide to a tetrahydro-2,2,5,5-tetraalkyl-4-oxo-3-furonitrile of the formula:

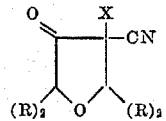

wherein R and X have the meaning above.

The addition of a mol of hydrogen sulfide to said furonitrile is carried out conveniently by adding the furonitrile to a solvent for said furonitrile which is at least partially saturated with ammonia, and then saturating the resulting solution with hydrogen sulfide. The reaction mixture is preferably maintained at a temperature of 0° to 5° C. during said reaction and is then maintained at said temperature for about 1 to 4 hours to ensure as complete reaction as possible. Solvents such as ethanol, methanol, isopropyl alcohol or methyl ethyl ketone may be employed.

The heterocyclic furan compounds which we employ as intermediates in the synthesis of our novel sedative and hypnotic compounds are obtained by first reacting acetylene with an aliphatic ketone.

wherein each R is an alkyl group, or together form a cycloaliphatic group, to yield an acetylenic alcohol of the formula,

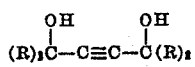

The acetylenic alcohol is then cyclized to form the dihydro-2,2,5,5-tetraalkyl-3-(2H) furanone.

and halogenation followed by reaction with an alkali metal cyanide yields the intermediate tetrahydro-2,2,5,5-tetraalkyl-4-oxo-3-furonitrile. The alkyl substituents on the furan nucleus will vary depending upon the ketone employed for the initial condensation with acetylene. As examples of aliphatic ketones which may be employed there may be mentioned acetone, methyl ethyl ketone, cyclohexanone, cyclopentanone, diethyl ketone, ethyl propyl ketone, diisopropyl ketone, methyl butyl ketone, etc.

In order further to illustrate our invention but without being limited thereto, the following examples are given:

Example I 55 parts by weight of tetrahydro-2,2,5,5-tetramethyl-4-oxo-3-furonitrile are dissolved in about 32 parts by weight of saturated ammoniacal ethanol. The solution is diluted by the addition of 32 parts by weight of absolute ethanol, then cooled to 0° C. and saturated with hydrogen sulfide while maintaining the temperature at 0° C. The reaction mixture formed is held at 0° C. for one hour and a precipitate of tetrahydro-2,2,5,5-tetramethyl-4-oxo-3-furanthiocarboxamide is formed. The precipitate is filtered, washed with water, dried and recrystallized from water. The product melts at 141–143° C.

Example II 19.5 parts by weight of 2,5-diethyl-2,5-dimethyl-4-oxo-tetrahydro-3-furanonitrile are dissolved in about 50 parts by weight of ammoniacal 95% ethyl alcohol (half-saturated with respect to ammonia), the solution obtained cooled to 0° C. and then saturated with hydrogen sulfide. The hydrogen sulfide saturated solution is maintained at 0–5° C. for 2 hours and the crystalline material which separates is filtered off. The filtrate is then distilled under vacuum to remove the solvent, the residue dissolved in petroleum ether, and the petroleum ether solution chilled. 4.5 parts by weight of tetrahydro-2,5-diethyl-2,5-dimethyl-4-oxo-3-furanthiocarboxamide are obtained as a white, crystalline product, which, on recrystallization from a mixture of petroleum ether and benzene is found to melt at 134–135° C.

This application is a continuation-in-part of our co-pending application Serial No. 448,744 filed on August 9, 1954, now abandoned.

The novel compounds of our invention depress the cerebral motor cortex and act as anti-convulsants. They are mildly acting hypnotic compounds and are useful for their sedative action when administered either orally or parenterally. In addition, they have been found to potentiate the activity of barbiturates even in very small doses when administered just prior to, together with or shortly after the administration of the barbiturate. Accordingly, the effective dose of certain barbiturates may be decreased without resulting any change in activity if our novel hypnotic compounds are utilized in a combined dosage form.

It is understood that the foregoing detailed description is given merely by way of illustration and that many variations may be made therein without departing from the spirit of our invention.

Having described our invention, what we desire to secure by Letters Patent is:

1. Compounds of the formula:

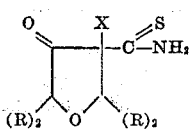

wherein R is a member of the group consisting of lower alkyl groups containing one to four carbon atoms and, taken together, a cycloaliphatic ring having 5 to 6 carbon atoms, and X is a member of the group consisting of hydrogen, chlorine and bromine.

2. Tetrahydro - 2,2,5,5 - tetramethyl - 4 - oxo - 3 - furanthiocarboxamide.

3. Tetrahydro - 2,5 - diethyl - 2,5 - dimethyl - 4 - oxo - 3 - furanthiocarboxamide.

4. Process for the production of compounds of the formula:

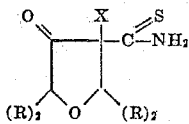

wherein each R is a member of the group consisting of lower alkyl groups containing one to four carbon atoms, and, taken together, a cycloaliphatic ring having five to six carbon atoms, and X is a member of the group consisting of hydrogen, chlorine and bromine, which comprises adding one mol of hydrogen sulfide to the cyano group of a tetrahydrofuranone of the formula:

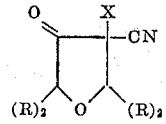

wherein R and X have the meaning above.

5. Process for the preparation of tetrahydro-2,2,5,5-tetramethyl-4-oxo-3-furanthiocarboxamide, which comprises adding one mol of hydrogen sulfide to the cyano group of tetrahydro-2,2,5,5-tetramethyl-4-oxo-3-furonitrile by reacting said compound with hydrogen sulfide in saturated ammoniacal ethanol while maintaining the temperature at about 0° C.

6. Process for the preparation of tetrahydro-2,5-diethyl-2,5-dimethyl-4-oxo-3-furanthiocarboxamide, which comprises adding one mol of hydrogen sulfide to the cyano group of tetrahydro - 2,5 - diethyl - 2,5 - dimethyl - 4 - oxo-3-furonitrile by reacting said compound with hydrogen sulfide in saturated ammoniacal ethanol while maintaining the temperature at about 0° C.

No references cited.